Oct. 25, 1938.  W. A. ARNESEN  2,134,279
OPHTHALMOSCOPE
Filed April 6, 1935  2 Sheets-Sheet 1

INVENTOR
Walter A. Arnesen
BY Ramsey & Kent
his ATTORNEYS

Oct. 25, 1938.  W. A. ARNESEN  2,134,279
OPHTHALMOSCOPE
Filed April 6, 1935   2 Sheets-Sheet 2

INVENTOR.
Walter A. Arnesen
BY Ramsay & Kent
his ATTORNEYS

Patented Oct. 25, 1938

2,134,279

UNITED STATES PATENT OFFICE 2,134,279

OPHTHALMOSCOPE

Walter A. Arnesen, New York, N. Y.

Application April 6, 1935, Serial No. 14,980

8 Claims. (Cl. 88—22)

This invention relates to improvements in ophthalmoscopes and more particularly to improvements in hand ophthalmoscopes of the character which are self-contained to the extent that the instrument contains a source of light and means for directing the source of light toward the field of investigation.

An object of the invention is to provide an ophthalmoscope of the foregoing character in which the casing is made of molded material, preferably in two pieces.

Another object of the invention is to provide a casing of molded insulated material so shaped that the major portions of the operating parts are effectively covered.

Another object of the invention is to provide novel means for illuminating the lens indicating numerals associated with the various lenses.

A further object of the invention is to provide novel means positioned in a part of the casing for holding the adjustable source of light rays in any desired position.

In carrying out the foregoing objects and other objects of the invention, an ophthalmoscope is so constructed that the casing thereof is made up of what may be called a back plate and a front plate, both composed of some suitable material, such as metal, a phenol condensation product, etc., which can be molded, die cast or otherwise processed into desired form. Preferably, this material is some phenol condensation product. The back plate has as an integral part thereof, a tube for the reception of a source of light rays and for the reception of a light rays bending device, such as for example a prism. The source of light rays is carried on the end of a cylindrical member which can be moved longitudinally of the tube formed integrally with the back plate, and in order that this cylinder can be held in any adjusted position until located therein, a friction element is mounted within the tube near the lower end thereof for gripping the cylinder.

The back plate has rotatably secured to the front surface thereof the primary lens carrier, and if the ophthalmoscope be of a compound nature, the back plate has a thinner portion near the top thereof to which is rotatably secured the secondary lens carrier. These two lens carriers are so positioned that the axes of the lens openings therein will coincide in coincidence with the inspection openings in the plates. The back plate is so shaped as to partially cover both the primary and the secondary lens carriers, leaving exposed only portions of the periphery thereof. The front plate is shaped to correspond to the outline of the back plate so that when the front plate is secured over the lens carriers, only portions of these carriers are left uncovered, such portions permitting manual operation of the carriers.

In one form of the invention, the inspection opening in the front plate is enlarged so that the number designating the lens in the primary lens carrier is visible to the operator, such number being immediately below its lens. The front plate is provided near the top thereof with an opening through which is visible a number designating a lens diametrically opposite thereto carried by the secondary lens carrier. In other forms of the invention means are provided for illuminating numbers associated with the lenses in the primary lens carrier, such means being so located that the numbers will be diametrically opposite to their associated lenses. In one form the source of light for illuminating the number comes directly from the source of light rays secured in the tubular part of the back plate. Various arrangements may be used in conjunction with this form of the invention for indicating various lenses. In another form of the invention the source of light rays comprises a luminous material positioned in a cavity in the back plate immediately behind the number position, so that the numbers will be illuminated as they are in proper position immediately in front of this luminous material.

Other features, objects and advantages of the invention will become apparent by reference to the following detailed description of the accompanying drawings, wherein Fig. 1 is a side elevation, partially fragmentary, of a device embodying the invention.

Fig. 15 is a plan view of a number disc used in the arrangement shown in Fig. 14.

Figure 1:
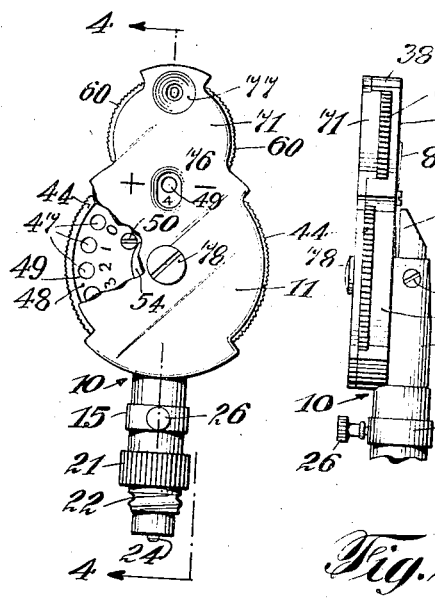
Figures 2, 3:
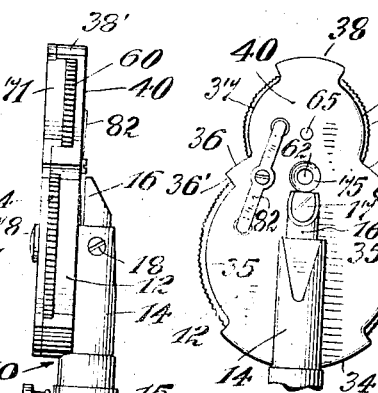
Fig. 2 is a fragmentary elevation at right angles to the showing of Fig. 1.
Fig. 3 is a view similar to Fig. 1 of the rear side of the device.

Referring now to the drawings and particularly to Figs. 1 to 6, inclusive, 10 indicates generally a back plate of the casing of the device, while 11 indicates the front plate. The back plate 10 is composed of a plate-like portion 12 and an integral cylindrical portion 14, part of which is immediately back of the plate-like part 12 and part of which extends therebelow as at 15. Secured in the upper end of the tubular part 14 is a tubular prism holder 16 having secured therein a prism or light bender 17. The holder 16 is held in place by means of a set screw 18 threaded through the wall of the tubular portion 14. Slidable in the tubular part 14 is a light carrier 19 in the nature of a cylinder into the top of which is screwed an electric light bulb 20. The cylinder 19 has a stop shoulder 21 below which are threads 22 for engagement in an electric socket. An insulated contact 24 extends through the member 19 to contact with the center terminal of the bulb 20. This contact 24 is insulted from the body of the member 19 so that the body can serve as one conductor in completing the electric circuit through the bulb 20. A part of the periphery of the member 19 is flattened as at 25 to be engaged by set screw 26 passing through a threaded bushing 27 firmly seated in the wall of the extension 15. The set screw 26, of course, serves to lock the member 19 in any desired position to properly focus the lamp 20. The extension 15 is provided near the bottom thereof with an internal annular groove 28 which has positioned therein an expansible spring ring 29. This spring ring 29 serves to hold the member 19 in adjusted position (due to friction) so that accurate adjustment can be made, after which member 19 can be locked in place by the set screw 26. A metallic lens cap 30 having a condensing lens 31 therein fits over the bulb 20.

Since the present ophthalmoscope is of the compound type, provision is made for securing primary and secondary lens carriers to the back plate 12. The back plate 12 is shaped to partially enclose and partially cover both the primary and secondary lens carriers. By reference to Fig. 3, it will be seen that the outline of this back plate consists of a lower arcuate shaped boundary 34 above which are arcuate shaped boundaries 35 of smaller radius connected to arcuate portions 36 of similar radius to the portion 34, and leading into arcuate shaped boundary portions 37 drawn on a different axis and of smaller radius and topped by an arcuate shaped portion 38 on the same axis as the portions 37 but of greater radius. Extending at right angles from the boundary portions 34, 36 and 38 are flanges 34', 36' and 38'. The purpose of these flanges will be explained later. The back plate 12 has a rounded portion 40 of one thickness extending into a partially rounded portion 41 of greater thickness. This difference in thickness is provided to accommodate the primary and secondary lens carriers which must rotate on different axes and in different planes in such manner that the lens openings thereof will coincide in one position.

The primary lens carrier is made up of a lens disc 44 having an annular portion 45 thinner than the hub portion. This part 45 is provided with a plurality of countersunk openings 46 to receive a plurality of lenses 47. These lenses are retained in place by means of a lens retainer disc 48 having openings 49 therein corresponding to the openings 46. The lens retainer disc 48 is of such thickness that when locked to the lens disc 45 by set screws 50, the surface of the retainer disc will be substantially flush with the surface of the hub part and the boundary part of the lens disc. The boundary part of such lens disc is milled or otherwise roughened as at 51 to facilitate rotation of the carrier manually. This carrier made up of lens disc, lenses and number disc, is rotatably secured to the body portion 41 of the back plate 12 by means of a stepped screw member 52 having a portion 53 threaded into the back plate. Washers 54 on each side of the carrier aid in permitting desired rotation of the carrier. The lens retainer disc is provided with reference numerals designating the proper lenses, which lenses, in this embodiment, are immediately adjacent to the numbers on the disc.

The secondary lens carrier is constructed in a manner similar to the construction described in relation to the primary lens carrier. This secondary lens carrier is composed of a lens disc 60 having a plurality of countersunk openings 61 therein for the reception of lenses 62 held in place by lens retainer disc 63. The boundary of the lens disc is knurled or otherwise roughened as at 64 and the lens carrier is locked to the back plate by means of a member 65 threaded into the thin portion 40 of the back plate. Inasmuch as the secondary lens carrier is not provided with lens openings entirely therearound, the retainer plate is provided with surface reference numbers diametrically opposite to the lens with which they are associated. The two extreme lenses 66 are preferably in the nature of color filter lenses. A stop pin 67 extends upwardly from the lens carrier for a purpose to be explained later.

The front plate 11 is of configuration similar to that described in conjunction with the back plate 12, in that it has arcuate boundary portions corresponding to the arcuate boundary portions of the back plate 12. The front plate 11 has a portion 70 overlying the primary lens carrier thinner than the portion 71 overlying the secondary lens carrier. This thicker portion 71 has a recess 72 therein, part of which is of diameter sufficient to receive the head of the member 65, and a part of which is enlarged to provide shoulders 73 against which the stop pin 67 will contact. This arrangement limits the degree of rotation of the secondary lens carrier so that it is not possible for a blank portion of the secondary lens carrier to be moved into inspection position.

Figure 4:
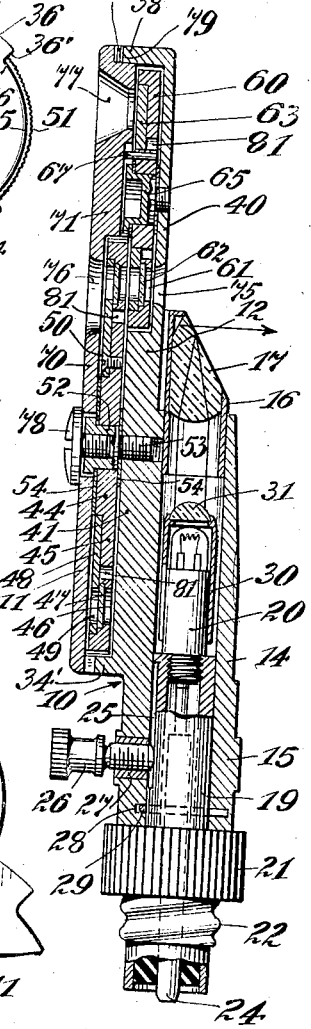
Fig. 4 is an enlarged section taken substantially on the line 4—4 of Fig. 1.
Figures 5, 6:
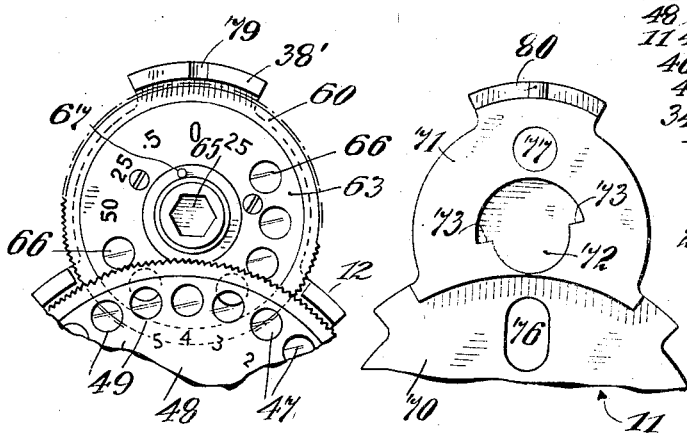
Fig. 5 is an enlarged fragmentary side elevation of a portion of the device with the cover plate removed.
Fig. 6 is an enlarged view of a showing of the inside of a front cover.
Figure 7:
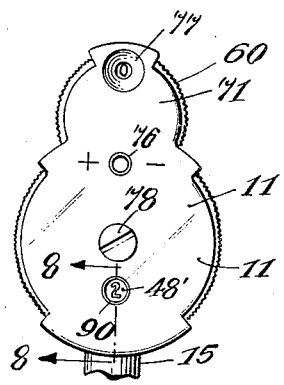
Fig. 7 is a front view of a modified form of the device.

The inspection position is determined by an inspection opening 75 in the back plate in alignment with an inspection opening 76 in the front plate. These two openings are so arranged as to coincide with the axes of lenses both in the primary and secondary lens carriers as shown in Fig. 4. The opening 76 is so prolonged as to uncover numbers on the primary lens carrier so that a user may readily know what lens in this primary lens carrier is at inspection position. An opening 77 is provided near the top of the front plate to serve as a window for the lens reference numbers of the secondary lens carrier. The front plate is locked to the back plate by means of a headed screw 78 threaded into the attaching member 52. When the front plate is locked to the back plate the flanges 34', 36' and 38' will be flush against the back of the front plate so that the lens carriers are enclosed at all points with the exception of small portions of their boundaries which extend beyond the parts 35 and 37 (Fig. 3), thus permitting manual rotation of the carriers but otherwise entirely enclosing these carriers. If desired, suitable tongue and groove arrangements may be provided on the plates for positively positioning them. A groove 79 is shown in the flange 38' into which a tongue 80 on the front plate fits. A similar tongue and groove arrangement can be provided in the flange 34' and the front plate.

As is customary in instruments of this type, holes are provided in the back plate in which are seated ratchet-like members to engage in indentations or openings 81 in the two lens carriers, such members being forced into engagement by a leaf spring 82 secured to the back surface of the back plate. These members operate to yieldingly permit rotation of the lens carriers and to properly position the lens carriers relative to the inspection opening.

In the modification shown in Figs. 7 to 10, provision is made for illuminating the lens indicating numerals so that the instrument can be used with greater facility in dark rooms. In this modification the front plate 12 is provided with a number opening 90 diametrically opposite the inspection opening 76', which latter opening is circular in form instead of being elongated as in Fig. 4. The back plate 12 has an opening 91 therein coaxial with the opening 90 in the front plate. The lens disc 45' (Fig. 8) is provided with a plurality of openings 92 spaced therearound in radial alignment with the lens openings and so located as to permit rays of light from the bulb 20 to be directed through the opening 91. The lens cap 300 has openings 110 therein which permit rays of light from the bulb to be directed through the opening 91. The lens retainer disc 48' has a plurality of openings 49' in register with the lenses 47 and has a plurality of lens numerals 150 etched therethrough or otherwise cut therethrough, such numerals being in position to line up respectively with the openings 90, 91 and 92. Thus, rays of light from the bulb 20 will pass through these numerals so that the numerals will in effect be illuminated through the opening or window 90. If desired a ground glass insert 91' may be placed in the opening 91 so that the rays of light will be diffused and will not pass through the numbers in the form of beams. A thin arcuate shaped piece of colored transparent material 120 may be placed between the discs of the carrier in position to underlie selected numerals. The difference in color of light passing through the lens numbers will serve to distinguish the types of lenses. As an alternative, certain of the numbers may have a small plus or minus sign adjacent thereto for the same purpose.

Figure 12:
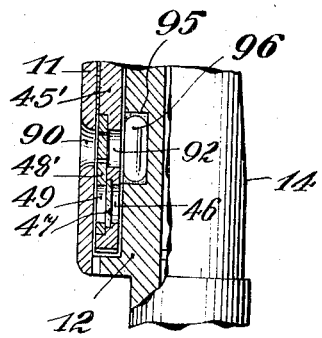
Fig. 12 is a view similar to Fig. 8 of a still further modified form of the invention.
Figure 13:
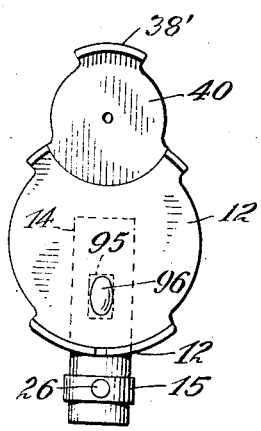
Fig. 13 is a plan view of the back plate of the body as modified in accordance with the showing of Fig. 12.

In the arrangement shown in Figs. 12 and 13 the back plate 12 is provided with a recess 95 in which is positioned a capsule 96 or other suitable container filled with some luminous substance. This luminous material takes the place of the rays of light from the bulb 20, and with the other parts constructed similar to the arrangement described in Figs. 7 to 10, the number will be illuminated sufficiently for ordinary purposes.

Figure 8:
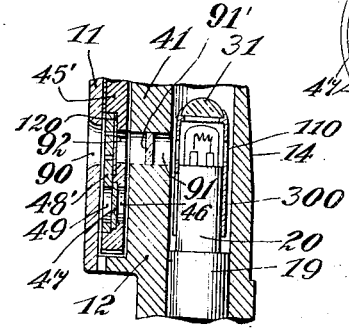
Fig. 8 is an enlarged section taken substantially on the line 8—8 of Fig. 7.
Figure 9:
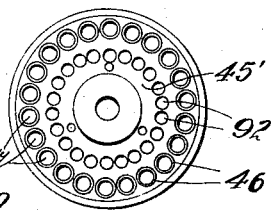
Fig. 9 is a plan view of a lens disc used in the assembly of Fig. 8.
Figure 10:
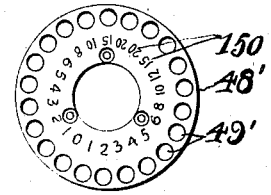
Fig. 10 is a similar view of the lens retainer disc used in the assembly.
Figure 11:
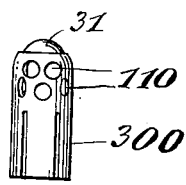
Fig. 11 is a side elevation of a lens cap fitting over the source of light rays.
Figure 14:
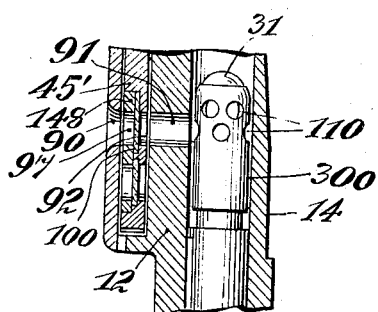
Fig. 14 is a view similar to Figs. 8 and 12 of a still further modification.

In the arrangement shown in Figs. 14 and 15 the back plate 12 is provided with a through opening 91 as in Figs. 8 and 12, and the lens disc 45' is provided with an opening 92. A lens retainer disc is utilized in this construction, such disc being similar to the retainer discs before described with the exception that the disc does not of itself contain numerals but is provided with openings 97, which are arranged to be coaxial with the openings 92. An annular member 100 of transparent material, such as paper, Celluloid, or any other suitable material, has thereon lens indicating numerals 151 so positioned as to be beneath the respective openings 97. This member 100 is positioned between the lens disc and the lens retainer disc. The numerals on the member 100 may be in contrasting colors to indicate the type of lens with which they are associated. The back plate 12 of this Figure 14 may have a recess therein for the reception of a capsule containing luminous matter to displace the light bulb shown in Figure 14. It is to be understood that the source of light rays can be substituted one for another in any of the arrangement of numerals in the various figures of drawings. In each of the arrangements described in Figs. 7 to 15, inclusive, it will be apparent that the lens indicating numerals will be diametrically opposite to their associated lenses instead of being radially disposed immediately inward of their lens as in Figures 1 to 6.

The operation and use of the instrument in any form described hereinbefore are substantially the same as are common to instruments of this character. The light bulb carrier is adjusted in the tubular portion of the back plate until the rays of light from the bulb 20 are properly focused relative to the prism or light bender 17. Adjustment of the bulb carrier is facilitated by the spring friction member 29 which serves to hold the carrier in adjusted position until the locking set screw 26 can be tightened. The prism 17 serves to direct light rays onto the field of examination and the operator by adjusting the lens carriers until the proper lens or lenses are in position at the inspection opening can make his diagnostic examination. While the instrument has been described as being constructed to accommodate a compound ophthalmoscope, that is, an ophthalmoscope having primary and secondary lens carriers, it is contemplated that the secondary lens carrier may be omitted if desired. Such omission does not impair the usefulness of the device. The casing of this instrument, namely, the front plate and the back plate with its integral bulb carrier cylinder, provides advantages not found in prior devices. This construction of molded complemental plates provides a casing which substantially completely encloses both the primary and secondary lens carriers, the only portions of these carriers uncovered being portions of the peripheries thereof which are left uncovered to permit manual manipulation of the carriers. Such covering of the important parts of the instrument assures that these parts will remain clean and will not be subject to such extraneous forces as might harm them. The molded plates also permit the entire casing to be made in two parts. The term "molded" used herein is to be construed to cover die casting or other suitable forms of processing for the purposes herein stated.

The novel numeral indicating arrangements shown in the modifications of the device possess the advantages that the operator may know at any time the character of the lens or lenses in the inspection position whether the instrument be used in a dark room or not.

I claim:

1. An instrument of the character described comprising a casing made up of complemental front and back plates of molded material, a lens carrier rotatably secured to said back plate, said back plate being provided with a structurally integral tubular portion, a carrier for a source of light rays adjustably secured in said tubular portion, a light bending member secured in one end of said portion, a resilient member secured to said tubular portion and frictionally engaging said source of light rays carrier to hold the same temporarily in adjusted position, and means for locking said source of light rays carrier in adjusted positions.

2. An instrument of the character described comprising a casing made up of complemental front and back plates of molded material, a lens carrier rotatably secured to said back plate, said back plate being provided with a structurally integral tubular portion, a carrier for a source of light rays adjustably secured in said tubular portion, a light bending member secured in one end of said portion, said tubular portion having an internal annular recess near one end thereof, a resilient member fitting in said recess and extending into the bore of said tubular portion to frictionally engage the said carrier of the source of light rays to hold the same temporarily in any adjusted position and means for locking said carrier of the source of light rays in various positions.

3. An instrument of the character described comprising a casing made up of complemental front and back plates of molded material, a lens carrier rotatably secured to said back plate, said carrier consisting of a lens disc having lens openings therein and having openings spaced inwardly of the lens openings and radially therewith, and a lens retainer disc having openings coaxial with the openings in said lens disc, and a disc of transparent material having lens identifying numerals thereon, said numeral disc being positioned between the lens disc and the lens retainer disc with the numerals thereon in register with the openings in said disc, and a source of light rays for projecting rays through said openings to illuminate the numerals on said numeral disc.

4. An instrument of the character described comprising a casing made up of complemental front and back plates of molded material, a lens carrier rotatably secured to said back plate, said carrier consisting of a lens disc having lens openings therein and having openings spaced inwardly of the lens opening and radially therewith, and a lens retainer disc having openings coaxial with the openings in said lens disc, and a disc of transparent material having lens identifying numerals thereon, said numeral disc being positioned between the lens disc and the lens retainer disc with the numerals thereon in register with the openings in said discs, said back plate being provided with an integral tubular portion, a source of light rays adjustably secured in said tubular portion, said back plate being provided with an opening communicating with the bore of said tubular portion and positioned to cause rays from said course to be directed through said lens carrier to illuminate said numerals selectively.

5. An instrument of the character described comprising a casing made up of complemental front and back plates of molded material, a lens carrier rotatably secured to said back plate, said carrier consisting of a lens disc having lens openings therein and having openings spaced inwardly of the lens openings and radially therewith, and a lens retainer disc having openings coaxial with the openings in said lens disc, and a disc of transparent material having lens identifying numerals thereon, said numeral disc being positioned between the lens disc and the lens retainer disc with the numerals thereon in register with the openings in said disc, said back plate being provided with a recess for the reception of a mass of luminous material, said recess being so positioned as to cause the rays from said source of luminous material to be projected through the openings in the lens carrier selectively.

6. An instrument of the character described comprising a casing of substantially uniform thickness, said casing being made up of front and back plates of molded material, said front and back plates having portions of different thickness, said plates being secured together with the thick and thin portions of the front plate registering respectively with the thin and thick portions of the back plate, and a pair of cooperating lens carriers between said plates, said carriers being rotatably secured to said different portions of said back plate in partially overlapped relation, said plates substantially completely covering the faces of said carriers and having cooperating parts enclosing portions of the peripheries of said carriers.

7. An instrument of the character described comprising a casing of substantially uniform thickness, said casing being made up of front and back plates of molded material, said front and back plates having portions of different thickness, said plates being secured together with the thick and thin portions of the front plate registering respectively with the thin and thick portions of the back plate, a pair of cooperating lens carriers between said plates, said carriers being rotatably secured to said different portions of said back plate in partially overlapped relation, said plates substantially completely covering the faces of said carriers, said back plate being provided with a structurally integral tubular portion extending substantially radially of one of said lens carriers and beyond the lower edge of said plate, a source of light rays adjustably secured in said tubular portion and a light bending member secured in one end of said tubular portion.

8. An instrument of the character described comprising a casing of substantially uniform thickness, said casing being made up of front and back plates of molded material, said front and back plates having portions of different thickness, said plates being secured together with the thick and thin portions of the front plate registering respectively with the thin and thick portions of the back plate, and a pair of cooperating lens carriers between said plates, said carriers being rotatably secured to said different portions of said back plate in partially overlapped relation, said plates substantially completely covering the faces of said carriers, one of said plates having arcuate shaped flanges contacting with the other of said plates to separate said plates and to enclose portions of the peripheries of said carriers, parts of the peripheral edges of said carriers extending beyond opposite edges of said plates and between said flanges whereby said carriers can be manually manipulated at either side of the casing.

WALTER A. ARNESEN.